(12) United States Patent
Park et al.

(10) Patent No.: US 9,899,675 B2
(45) Date of Patent: Feb. 20, 2018

(54) METHOD FOR PREPARING PRECURSOR OF LITHIUM COMPOSITE TRANSITION METAL OXIDE USING A REACTOR

(71) Applicant: LG Chem, Ltd., Seoul (KR)

(72) Inventors: Byungchun Park, Daejeon (KR); Seong Hoon Kang, Daejeon (KR); HoSuk Shin, Seoul (KR); SangMin Park, Daejeon (KR); Hong Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 157 days.

(21) Appl. No.: 15/040,348

(22) Filed: Feb. 10, 2016

(65) Prior Publication Data

US 2016/0164090 A1 Jun. 9, 2016

Related U.S. Application Data

(60) Division of application No. 14/247,726, filed on Apr. 8, 2014, now abandoned, which is a continuation of
(Continued)

(30) Foreign Application Priority Data

Feb. 1, 2012 (KR) .......................... 10-2012-0010134

(51) Int. Cl.
*H01M 4/00* (2006.01)
*H01M 4/505* (2010.01)
(Continued)

(52) U.S. Cl.
CPC ............. *H01M 4/505* (2013.01); *B01J 19/18* (2013.01); *B01J 19/28* (2013.01);
(Continued)

(58) Field of Classification Search
CPC .......... H01M 4/48–4/57; H01M 4/505; H01M 4/525; C01G 53/006; C01G 53/04;
(Continued)

(56) References Cited

U.S. PATENT DOCUMENTS

| 5,556,765 A | 9/1996 | Dedolph |
| 6,471,392 B1 * | 10/2002 | Holl ......................... B01F 7/12 |
| | | 366/279 |

(Continued)

FOREIGN PATENT DOCUMENTS

| CN | 101300696 A | 11/2008 |
| JP | H05200260 A | 8/1993 |

(Continued)

OTHER PUBLICATIONS

Machine Translation of KR-2012-0028576, Mar. 23, 2012.*
(Continued)

*Primary Examiner* — Steven Bos
(74) *Attorney, Agent, or Firm* — Lerner, David, Littenberg, Krumholz & Mentlik, LLP

(57) ABSTRACT

Disclosed is a method for preparing a precursor of lithium composite transition metal oxide for lithium secondary batteries, using a reactor having a closed structure including an outer stationary cylinder; an inner rotary cylinder on the same axis; and a rotation reaction area disposed between them, wherein ring-shaped vortex pairs that are uniformly arranged in a rotation axis direction and rotate in opposite directions are formed in the rotation reaction area. According to the method of the invention, raw materials comprising an aqueous solution of two or more transition metal salts, an aqueous solution of a complex forming additive, and a basic aqueous solution for maintaining pH are fed through an inlet into the rotation reaction area where a coprecipitation reaction is performed under a non-nitrogen atmosphere to form
(Continued)

lithium composite transition metal oxide particles which are then discharged through a reactor outlet.

11 Claims, 6 Drawing Sheets

Related U.S. Application Data application No. PCT/KR2012/007058, filed on Sep. 4, 2012.

(51) Int. Cl.
| | | |
|---|---|---|
| *B01J 19/18* | (2006.01) | |
| *B01J 19/28* | (2006.01) | |
| *C01G 45/12* | (2006.01) | |
| *C01G 51/00* | (2006.01) | |
| *C01G 53/00* | (2006.01) | |
| *C01G 53/04* | (2006.01) | |
| *H01M 4/525* | (2010.01) | |
| *H01M 10/052* | (2010.01) | |

(52) U.S. Cl.
CPC ......... *C01G 45/1221* (2013.01); *C01G 51/42* (2013.01); *C01G 53/006* (2013.01); *C01G 53/04* (2013.01); *C01G 53/42* (2013.01); *H01M 4/525* (2013.01); *C01P 2006/40* (2013.01); *H01M 10/052* (2013.01)

(58) Field of Classification Search
CPC .... C01G 51/006; C01G 51/04; C01G 45/006; C01G 45/02; C01G 49/0018; C01G 49/009; C01G 49/02; B01J 19/18; B01J 19/1812; B01J 19/1843; B01J 19/1887; B01J 8/10; B01F 7/02; B01F 7/12; B01F 7/28; B01F 7/285
USPC ...... 423/43, 50, 58, 115, 140–144, 158–160, 423/164, 277, 593.1–594.16; 422/225; 241/293
See application file for complete search history.

(56) References Cited

U.S. PATENT DOCUMENTS

| 8,394,299 B2* | 3/2013 | Shin ....................... C01D 15/02 252/500 |
|---|---|---|
| 2006/0062702 A1* | 3/2006 | Hagemeister ....... B01F 7/00908 422/131 |
| 2009/0053811 A1 | 2/2009 | Black et al. |
| 2013/0122370 A1 | 5/2013 | Rho et al. |
| 2014/0065058 A1* | 3/2014 | Park ...................... H01M 4/485 423/594.3 |
| 2014/0147338 A1 | 5/2014 | Hong et al. |
| 2014/0272587 A1* | 9/2014 | Kang .................... H01M 4/485 429/220 |
| 2015/0311521 A1* | 10/2015 | Ryu ........................ C01G 1/02 252/182.1 |

FOREIGN PATENT DOCUMENTS

| JP | H06254384 A | 9/1994 |
|---|---|---|
| JP | H07008775 A | 1/1995 |
| JP | 2011083768 A | 4/2011 |
| JP | 2013105749 A | 5/2013 |
| JP | 2013539176 A | 10/2013 |
| KR | 20060130964 A | 12/2006 |
| KR | 100733969 B1 | 7/2007 |
| KR | 20070109878 A | 11/2007 |
| KR | 20080093779 A | 10/2008 |
| KR | 20090105868 A | 10/2009 |
| KR | 100926414 B1 | 11/2009 |
| KR | 20110099935 A | 9/2011 |
| KR | 2011-0135623 | * 12/2011 |
| KR | 20120028576 A | 3/2012 |
| TW | 201000406 A | 1/2010 |
| TW | 201126802 A | 8/2011 |
| WF | 2013042986 A2 | 3/2013 |
| WO | 9411096 A1 | 5/1994 |
| WO | 2007129848 A1 | 11/2007 |

OTHER PUBLICATIONS

Machine Translation of KR-2011-0135623, Dec. 19, 2011.*
International Search Report for PCT/KR2012/007058 dated Feb. 15, 2013.
Example of PIV Measurement on the Flow Field of Taylor-couette Reactor, Journal of Lanzhou Jistong University, vol. 30, No. 6, Dec. 2011.
"Taylor-Couette flow," Wikipedia, the free encyclopedia. Retrieved on May 23, 2015, from the Internet: URL:https://en.wikipedia.org/wiki/Taylor%E2%80%93Couette_flow.
Supplementary Search Report from European Application No. 12 86 7537, dated Aug. 27, 2015.
Machine translation for KR 2011-0099935 (Sep. 2011).
Machine translation for KR Application No. 10-2008-0053730, corresponding to KR 10-0926414 (Nov. 2009).

* cited by examiner

METHOD FOR PREPARING PRECURSOR OF LITHIUM COMPOSITE TRANSITION METAL OXIDE USING A REACTOR

CROSS-REFERENCE TO RELATED APPLICATIONS

This application is a divisional of U.S. application Ser. No. 14/247,726, filed Apr. 8, 2014, which is a continuation of International Application No. PCT/KR2012/007058, filed Sep. 4, 2012, which claims the benefit of Korean Patent Application No. 10-2012-0010134, filed Feb. 1, 2012, the disclosures of which are incorporated herein by reference.

TECHNICAL FIELD

The present invention relates to a reactor for preparing a precursor of lithium composite transition metal oxide and a method for preparing the precursor.

BACKGROUND ART

Technological development and increased demand for mobile equipment have led to a rapid increase in the demand for secondary batteries as energy sources. Among these secondary batteries, lithium secondary batteries having high energy density and voltage, long lifespan and low self-discharge are commercially available and widely used.

Among components of lithium secondary batteries, a cathode active material has an important role in determining capacity and performance of batteries.

Lithium cobalt oxide ($LiCoO_2$) having superior physical properties such as superior cycle characteristics is generally used as a cathode active material. However, cobalt used for $LiCoO_2$ is a metal, so-called "rare metal", which is low in deposits and are produced in limited areas, thus having an unstable supply. Also, $LiCoO_2$ is disadvantageously expensive due to unstable supply of cobalt and increased demand of lithium secondary batteries.

Under these circumstances, research associated with cathode active materials that are capable of replacing $LiCoO_2$ has been continuously made. Representative substitutes include lithium composite transition metal oxides containing two or more transition metals of nickel (Ni), manganese (Mn) and cobalt (Co).

The lithium composite transition metal oxide exhibits superior electrochemical properties through combination of high capacity of lithium nickel oxide ($LiNiO_2$), thermal stability and low price of manganese in layered-structure lithium manganese oxide ($LiMnO_2$), and stable electrochemical properties of $LiCoO_2$, but is not easy to synthesize through a simple solid reaction.

Accordingly, the lithium composite transition metal oxide is prepared by separately preparing a composite transition metal precursor containing two or more transition metals of nickel (Ni), manganese (Mn), and cobalt (Co) using a sol-gel method, a hydrothermal method, spray pyrolysis, coprecipitation or the like, mixing the composite transition metal with a lithium precursor, followed by mixing and baking at a high temperature.

In terms of cost and production efficiency, a composite transition metal precursor is generally prepared by coprecipitation.

In conventional methods, composite transition metal precursors were prepared by coprecipitation, based on research that focuses on formation of spherical particles, such as optimization of particle size, in order to prepare lithium composite transition metal oxide that exhibits superior discharge capacity, lifespan, and rate characteristics when used as a cathode active material. Structure properties of composite transition metal precursors as well as formation of spherical particles thereof are considerably important.

However, a conventional coprecipitation reactor, for example, a continuous stirred tank reactor (CSTR) has a problem of low retention time taken for controlling the structure of composite transition metal precursors.

Also, due to long retention time, precursor particles prepared using a conventional coprecipitation reactor have a wide particle size distribution and a non-uniform particle shape and contain a great amount of impurities.

Also, in a case in which precursor particles are prepared using a conventional coprecipitation reactor, it is disadvantageously difficult to adjust the mean particle size of the precursor particles to a level smaller than 6 μm.

DISCLOSURE

Technical Problem

Therefore, the present invention has been made to solve the above problems and other technical problems that have yet to be resolved.

As a result of a variety of extensive and intensive studies and experiments, the inventors of the present invention have discovered that, when ring-shaped vortex pairs that rotate in opposite directions are prepared in reaction areas that are optimized at preparation of a precursor of lithium composite transition metal oxide for lithium secondary batteries, a retention time can be considerably reduced and uniform precursor particles having a narrow particle size distribution and a small mean particle size can be prepared. Based on this discovery, the present invention has been completed.

Technical Solution

In accordance with one aspect of the present invention, provided is a reactor for preparing a precursor of lithium composite transition metal oxide for lithium secondary batteries, the reactor having a closed structure including: a stationary hollow cylinder; a rotary cylinder having the same axis as the stationary hollow cylinder and an outer diameter smaller than an inner diameter of the stationary hollow cylinder; an electric motor to generate power, enabling rotation of the rotary cylinder; a rotation reaction area disposed between the stationary hollow cylinder and the rotary cylinder, wherein ring-shaped vortex pairs that are uniformly arranged in a rotation axis direction and rotate in opposite directions are formed in the rotation reaction area; and an inlet through which a reactant fluid is fed into the rotation reaction area and an outlet through which the reactant fluid is discharged from the rotation reaction area, wherein a ratio of a distance between the stationary hollow cylinder and the rotary cylinder to the outer radius of the rotary cylinder is higher than 0.05 and lower than 0.4.

When a composite transition metal hydroxide is prepared using a conventional coprecipitation reactor, for example, CSTR, a long retention time of about 6 hours or more is required.

Meanwhile, when composite transition metal hydroxide is prepared using the reactor of the present invention, a retention time of about 6 hours in maximum is required and exhibits an about 1.5- to 10-fold increase in production amount per unit volume of reactor, as compared to CSTR.

The effect can be obtained when the ratio of the distance between the stationary hollow cylinder and the rotary cylinder to the outer radius of the rotary cylinder is higher than 0.05. Specifically, when the ratio of the distance between the stationary hollow cylinder and the rotary cylinder to the outer radius of the rotary cylinder is 0.05 or less, the distance between the stationary hollow cylinder and the rotary cylinder is excessively fine, making production impossible. Also, although production is possible, disadvantageously, an active volume of rotation reaction area of the vortex pairs produced is decreased and a retention time is thus greatly decreased.

Meanwhile, one vortex pair substantially serves as one fine CSTR, and vortex pairs uniformly arranged along the rotational axis thus play the same role as connected fine CSTRs. As the number of vortex pairs increases, flowability is enhanced.

However, since the size of one vortex pair is substantially similar to the distance between the stationary hollow cylinder and the rotary cylinder, as the ratio of the distance between the stationary hollow cylinder and the rotary cylinder to the outer radius of the rotary cylinder increases, or the distance between the stationary hollow cylinder and the rotary cylinder increases, the number of the vortex pairs in the reactor ("number of CSTRs") gradually decreases.

Accordingly, when the ratio of the distance between the stationary hollow cylinder and the rotary cylinder to the outer radius of the rotary cylinder is 0.4 or higher, formation of uniform precursor particles having a narrow particle size distribution and a small mean particle size due to low flowability of the vortex pairs is more difficult than when the ratio of the distance between the stationary hollow cylinder and the rotary cylinder to the outer radius of the rotary cylinder is higher than 0.05 and lower than 0.4.

Also, when the ratio of the distance between the stationary hollow cylinder and the rotary cylinder to the outer radius of the rotary cylinder is 0.4 or more, continuous vortex properties of ring-shaped vortex pairs (vortex of "laminar flow"), wave vortexes, modulated wave vortexes and turbulent flow vortexes, which are uniformly arranged along the rotation axis direction and rotate in opposite directions is not observed and transition from the vortex region of the laminar flow to the vortex region of the turbulent flow immediately occurs due to an increase in rotation speed of the rotary cylinder. For this reason, flowability of the vortex pairs is deteriorated and production of uniform precursor particles having a narrow particle size distribution and a small mean particle size is thus difficult.

That is, composite transition metal hydroxide prepared using the reactor of the present invention is prepared as uniform precursor particles having a small particle size distribution and a small mean particle size, as compared to composite transition metal hydroxide prepared using CSTR, but this control of particle size distribution and mean particle size can be obtained when the ratio of the distance between the stationary hollow cylinder and the rotary cylinder to the outer radius of the rotary cylinder is lower than 0.4.

The reactor is optimally designed for preparation of a precursor of lithium composite transition metal oxide, i.e., transition metal hydroxide, for lithium secondary batteries. In this case, a kinematic viscosity of reactant fluid is 0.4 to 400 cP, and power consumed per unit weight is 0.05 to 100 W/kg. The power consumed per unit weight is defined as a stirring speed of the rotary cylinder.

A critical Reynolds number at which the vortex pairs are generated is about 300. The vortex pairs are formed over the entire surface of the rotation reaction area, since fluids that flow between the stationary hollow cylinder and the rotary cylinder that have the same axis tend to travel in the stationary hollow cylinder direction due to centrifugal force and thus become unstable when the Reynolds number is 300 or more.

The reactor of the present invention enables production of uniform precursor particles having a smaller particle size, as compared to a case of the CSTR reactor, using ring-shaped vortex pairs.

Specifically, the composite transition metal hydroxide prepared using CSTR has a maximum mean particle size of 6 μm to 10 μm, but the reactor of the present invention enables preparation of precursor particles having a mean particle size smaller than 6 μm. It is natural that composite transition metal hydroxide having a mean particle size of 6 μm or more can be prepared using the reactor of the present invention.

Also, composite transition metal hydroxide prepared using the reactor of the present invention has a smaller particle size distribution than composite transition metal hydroxide prepared using CSTR. A coefficient of variation converted from this particle size distribution is within a range of 0.2 to 0.7. A coefficient of variation is a value obtained by dividing a standard deviation by a mean particle diameter (D50).

In a specific embodiment of the present invention, composite transition metal hydroxide has a mean particle size of 1 μm to 8 μm, more specifically, 1 to 5 μm. In this case, the coefficient of variation may be within a range of 0.2 to 0.7.

Meanwhile, the inlet and/or outlet includes a structure including two or more inlets and/or outlets, and more specifically, includes a structure in which two or more inlets and/or outlets are spaced from one another on the stationary cylinder by a predetermined distance.

In a specific embodiment of the present invention, the reactor may include one inlet and one outlet, and in some cases, include two or more inlets arrayed by a predetermined distance in the outlet direction.

As such, in a case in which the two or more inlets are arrayed in the outlet direction by a predetermined distance, raw materials may be injected into one inlet and coating materials may be injected into the other inlet.

Also, the rotary cylinder has an outer surface provided with protrusions to facilitate mixing of reactants.

The present invention also provides a method for preparing composite transition metal hydroxide particles using the reactor.

The preparation method according to the present invention is characterized in that composite transition metal hydroxide particles are produced by injecting raw materials comprising an aqueous solution of two or more transition metal salts and an aqueous solution of a complex-forming additive, and a basic aqueous solution for maintaining pH of an aqueous solution of the raw materials within a range of 10 to 12, into the rotation reaction area of the reactor through the inlet, and performing coprecipitation reaction under a non-nitrogen atmosphere for 1 to 6 hours. The composite transition metal hydroxide particles can be obtained through the outlet.

Preferably, the transition metal salt has anions which are readily degraded and volatile during baking, and may be sulfate or nitrate. Examples of the transition metal salts include, but are not limited to, one or two or more selected from the group consisting of nickel sulfate, cobalt sulfate, manganese sulfate, nickel nitrate, cobalt nitrate and manganese nitrate.

Also, examples of the basic aqueous solution include an aqueous sodium hydroxide solution, an aqueous potassium hydroxide solution, an aqueous lithium hydroxide solution and the like. Preferably, the basic aqueous solution may be an aqueous sodium hydroxide solution, but is not limited thereto.

In a preferred embodiment, the aqueous solution of raw materials may further comprise an additive and/or alkali carbonate that can form a complex with a transition metal. The additive may be for example an ammonium ion donor, an ethylene diamine compound, a citric acid compound or the like. Examples of the ammonium ion donor include aqueous ammonia, an ammonium sulfate aqueous solution, an ammonium nitrate aqueous solution and the like. The alkali carbonate may be selected from the group consisting of ammonium carbonate, sodium carbonate, potassium carbonate and carbonate lithium. In some cases, a combination of two or more of these alkali carbonates may be also used.

The amounts of the added additive and alkali carbonate may be suitably selected, taking into consideration amount of transition metal-containing salts, pH and the like.

The inventors of the present application identified that the amount of complex-forming additive, for example, aqueous ammonia solution, can be reduced, when composite transition metal hydroxide is prepared in accordance with the preparation method of the present invention.

In a specific embodiment of the present invention, the aqueous ammonia solution is added in an amount of 5 to 90 mol %, based on the total amount of two or more transition metal salts.

As compared to a case in which composite transition metal hydroxide is prepared using CSTR, a case in which composite transition metal hydroxide is prepared only using about 60% of an additive, according to the preparation method of the present invention, can provide lithium composite transition metal oxide at a relatively low cost.

The composite transition metal hydroxide may be a compound represented by Formula 1 below:

$$M(OH_{1-x})_2 \qquad (1)$$

wherein M comprises two or more selected from the group consisting of Ni, Co, Mn, Al, Cu, Fe, Mg, B, Cr and transition metals of the second period; and $0 \leq x \leq 0.8$.

In Formula 1, M comprises two or more selected from the elements defined above. In a preferred embodiment, M comprises one or more transition metals selected from the group consisting of Ni, Co and Mn, and is composed so that lithium composite transition metal oxide can exhibit at least one physical property of the transition metals. Particularly preferably, M comprises two transition metals selected from the group consisting of Ni, Co and Mn, or all of them.

As a preferred embodiment of a compound in which M comprises Ni, Co, Mn or the like, a compound represented by Formula 2 below may be used.

$$Ni_bMn_cCo_{1-(b+c+d)}M''_d(OH_{1-x})_2 \qquad (2)$$

wherein $0.3 \leq b \leq 0.9$, $0.1 \leq c \leq 0.6$, $0 \leq d \leq 0.1$, $b+c+d \leq 1$, $0 \leq x \leq 0.8$ and M'' is one, or two or more selected from the group consisting of Al, Mg, Cr, Ti and Si. That is, the compound of Formula 1 may be a compound of Formula 2 that comprises Ni, Co and Mn and is partially substituted by one, or two or more selected from the group consisting of Al, Mg, Cr, Ti and Si.

The compound of Formula 2 contains a high Ni content and is thus particularly preferably used in the preparation of a high-capacity cathode active material for lithium secondary batteries.

The composite transition metal hydroxide has superior crystallinity as compared to composite transition metal hydroxide using CSTR. Specifically, the crystallinity may be evaluated, based on the content of impurities derived from transition metal salts for preparing transition metal hydroxide.

The inventors of the present application demonstrated that the composite transition metal hydroxide contains 0.4% by weight or less of impurities derived from transition metal salts for preparing transition metal hydroxide, based on the total weight of the composite transition metal hydroxide particles.

The impurity may be a salt ion containing a sulfate ion $(SO_4^{2-})$. The transition metal salt derived from the sulfate ion $(SO_4^{2-})$-containing salt ion may be sulfate and examples of sulfate include nickel sulfate, cobalt sulfate, manganese sulfate and the like. The sulfate may be used alone or in combination of two or more thereof.

In some cases, the sulfate ion $(SO_4^{2-})$-containing salt ion may further contain a nitrate ion $(NO_3^-)$ and the nitrate ion may be derived from transition metal salts including nickel nitrate, cobalt nitrate and manganese nitrate.

More preferably, the content of the sulfate ion $(SO_4^{2-})$-containing salt ion is 0.3 to 0.4% by weight, based on the total weight of the composite transition metal hydroxide particles.

Methods for measuring the content present in the precursor may be varied and, preferably, detection using ion chromatography defined below may be used.

The present invention also provides lithium composite transition metal oxide prepared by baking the precursor particles together with a lithium precursor.

The reaction conditions of the transition metal precursor and the lithium-containing material for preparation of lithium composite transition metal oxide are well-known in the art and a detailed description thereof is omitted herein.

The lithium precursor may be used without particular limitation and examples thereof include lithium hydroxide, lithium carbonate, lithium oxide and the like. Preferably, the lithium precursor is lithium carbonate ($Li_2CO_3$) and/or lithium hydroxide (LiOH).

Meanwhile, manganese (Mn) is readily oxidized and becomes $Mn_3^+$. For example, $Mn^{3+}$ makes formation of homogeneous composite oxide with $Ni_2^+$ difficult. For this reason, conventional coprecipitation methods include further introduction of additives to prevent formation of Mn oxide. Since the preparation method according to the present invention is performed in a sealed reactor, a risk of formation of Mn oxide caused by incorporation of exterior air in the reaction solution can be eliminated.

Accordingly, advantageously, the preparation method according to the present invention is performed under a non-nitrogen atmosphere without adding a reducing agent, for example, nitrogen, thus advantageously reducing nitrogen addition costs and improving process efficiency.

Effects of Invention

As apparent from the afore-going, the reactor of the present invention is effective in reducing retention time and providing uniform precursor particles having a small size.

Also, the preparation method according to the present invention provides precursor particles having a low impurity content and high crystallinity.

As a result, the precursor particles prepared by the preparation method according to the present invention is effective in improving reactivity with lithium precursors, reducing baking temperature of lithium composite transition metal oxide, and improving electrochemical properties such as rate characteristics and low-temperature characteristics.

Also, the preparation method according to the present invention reduces consumption of energy per unit volume and provides a lithium composite transition metal oxide at a low cost due to use of relatively small amounts of complex-forming additives.

BEST MODE

Now, the present invention will be described in more detail with reference to the following examples. These examples are provided only to illustrate the present invention and should not be construed as limiting the scope and spirit of the present invention.

Figure 1:
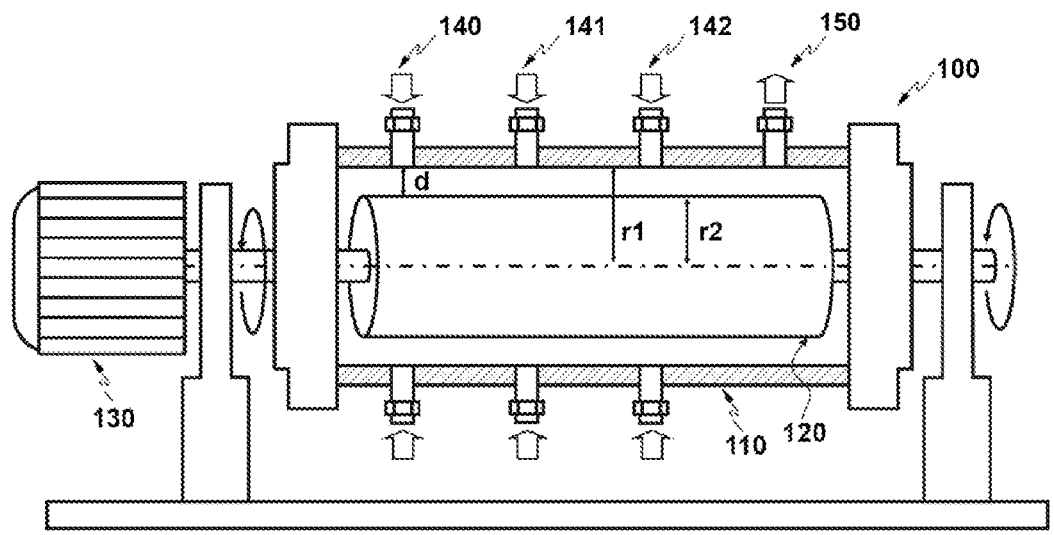
FIG. 1 is a schematic side view illustrating a reactor according to one embodiment of the present invention.
Figure 2:
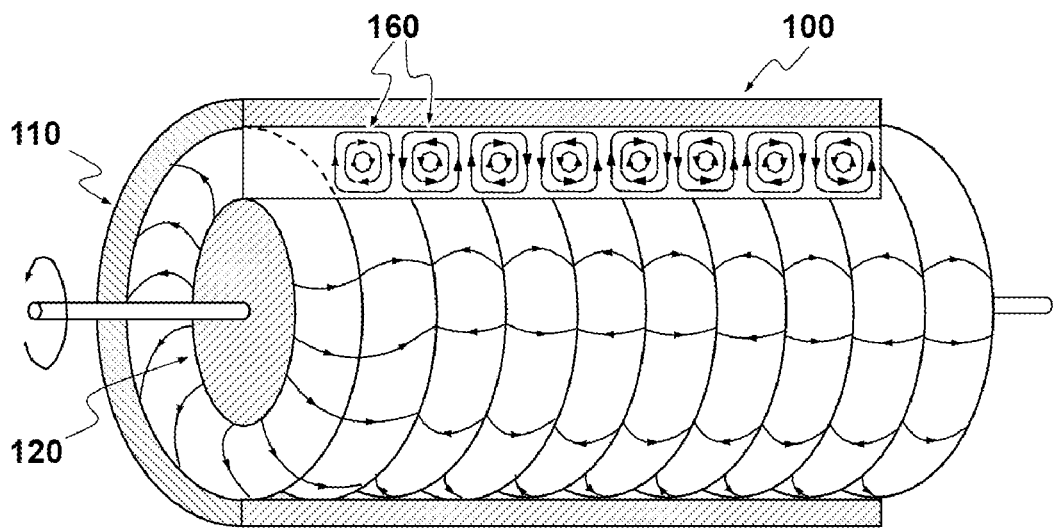
FIG. 2 is a schematic view illustrating flow behaviors of ring-shaped vortex pairs and reactant fluids generated in rotation reaction area of the reactor of FIG. 1.
Figure 3:
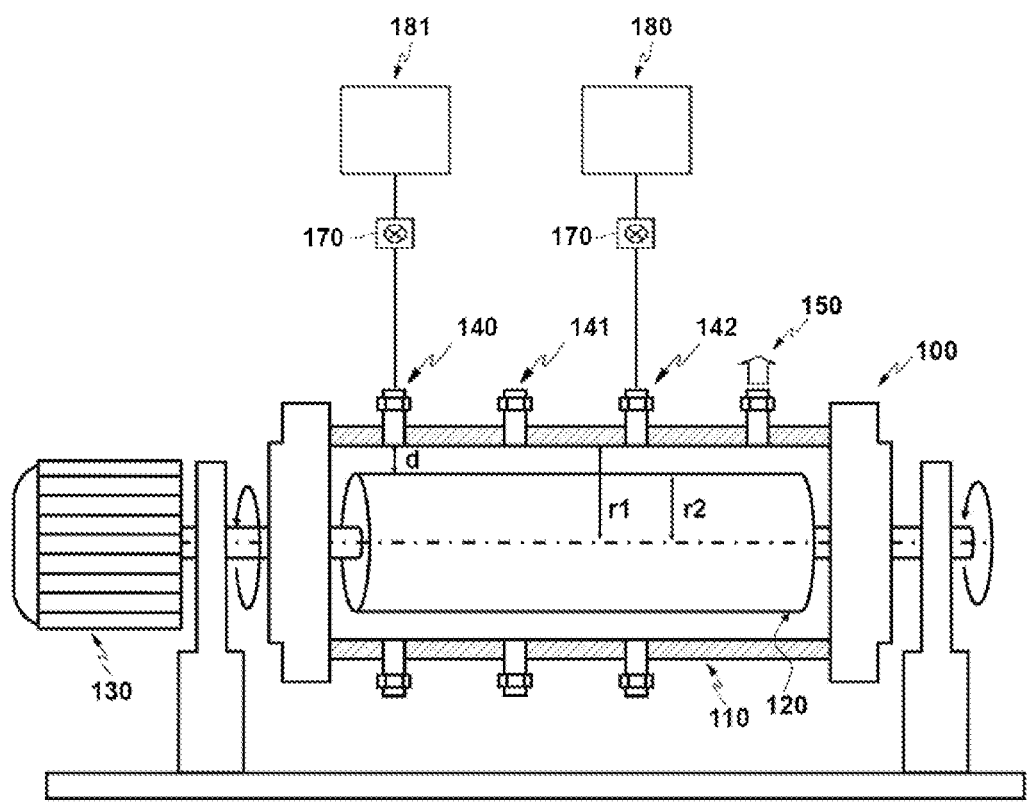
FIG. 3 is a schematic side view illustrating a reactor according to another embodiment of the present invention.

FIG. 1 is a schematic side view illustrating a reactor according to one embodiment of the present invention, FIG. 2 is a schematic view illustrating flow behaviors of ring-shaped vortex pairs and reactant fluids generated in rotation reaction area of the reactor of FIG. 1, and FIG. 3 is a schematic side view illustrating a reactor according to another embodiment of the present invention.

Referring to FIG. 1, a reactor 100 for preparing a precursor of lithium composite transition metal oxide for lithium secondary batteries according to the present invention include a rotary cylinder 120 mounted in the stationary hollow cylinder 110, wherein the rotary cylinder 120 has the same rotation axis as the stationary hollow cylinder 110 and has an outer diameter (2×r2) smaller than an inner diameter (2×r1) of the stationary hollow cylinder, rotation reaction area is formed between the stationary hollow cylinder 110 and the rotary cylinder 120, a plurality of inlets 140, 141 and 142, through which reactant fluids are injected into the rotation reaction area, and an outlet 150, through which reactant fluids are discharged from the rotation reaction area, are formed on the stationary hollow cylinder 110, and an electric motor 130 to generate power, enabling rotation of the rotary cylinder 120, is provided at a side of the stationary hollow cylinder 110.

A ratio (d/r2) of the distance (d) between the stationary hollow cylinder 110 and the rotary cylinder 120 to the outer radius (r2) of the rotary cylinder 120 determines an effective volume of the rotation reaction area.

Referring to FIGS. 1 and 2, when the rotary cylinder 120 is rotated by the power generated from the electric motor 130 and an Reynolds number reaches a critical level, reactant fluids such as aqueous solution of composite transition metal hydroxide, aqueous ammonia solution and an aqueous sodium hydroxide solution injected into the rotation reaction area through the inlets 140, 141 and 142 receive centrifugal force in the direction of the stationary hollow cylinder 110 from the rotary cylinder 120 and thus become unstable. As a result, ring-shaped vortex pairs 160 rotating in opposite directions along the rotation axis direction are uniformly arrayed.

The length of the ring-shaped vortex pairs 160 in a direction of gravity is substantially equivalent to the distance (d) between the stationary hollow cylinder 110 and the rotary cylinder 120.

In order to prevent permeation of air into the gap between a rotation axis and a bear ring during rotation of the rotary cylinder 120, the rotation axis may be sealed using a sealing material such as O-ring.

Referring to FIGS. 1 and 3, reactant materials such as aqueous transition metal salt solution, aqueous ammonia solution and aqueous sodium hydroxide solution may be injected through the inlet 140 into the rotation reaction area and different kinds of materials such as coating materials may be injected through the inlet 141 or the inlet 142 into the rotation reaction area.

As shown in FIG. 3, a reactor according to another embodiment of the present invention includes storage tanks 180 and 181 to store reactant fluids such as an aqueous transition metal salt solution, an aqueous ammonia solution and an aqueous sodium hydroxide solution, and a metering pump 170 to control an amount of reactant fluids injected into the rotation reaction area.

The aqueous transition metal salt solution may be injected into rotation reaction area using the metering pump 170, while taking into consideration retention time, the aqueous sodium hydroxide solution may be variably injected into the rotation reaction area using the metering pump 170 such that pH is maintained at a predetermined level, and the aqueous ammonia solution may be continuously supplied through the metering pump 170.

After completion of reaction, the composite transition metal hydroxide is obtained through the outlet 150.

The reactor 100 may further include a heat exchanger mounted on the stationary hollow cylinder 110, to control a reaction temperature in the process of mixing reactant fluids using vortex pairs 160 in the rotation reaction area between the stationary hollow cylinder 110 and the rotary cylinder 120, and the heat exchanger may be selected from heat exchangers well-known in the art to which the present invention pertains.

Figure 4:
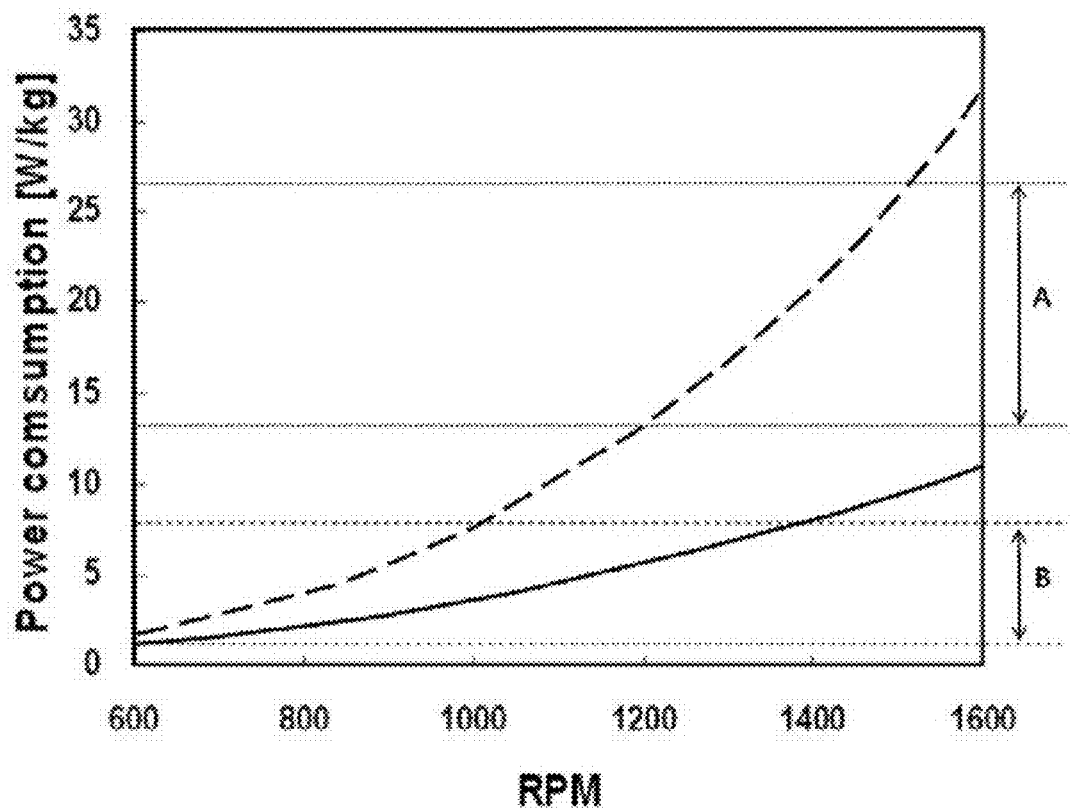
FIG. 4 is a graph showing comparison in power consumed per unit weight between a CSTR and a reactor according to the present invention.

FIG. 4 is a graph showing comparison in power consumed per unit weight between a CSTR and a reactor according to the present invention. A 4 L CSTR consumes a rotation power of 1,200 to 1,500 rpm to obtain a desired particle size in precursor synthesis. This power is about 13 to 27 W/kg, when converted into a rotation power per unit weight (region A). Meanwhile, the 0.5 L reactor according to the present invention enables synthesis of precursors having a desired particle size in a rotation power range of 600 to 1,400 rpm. This power is about 1 to 8 W/kg, when converted into a rotation power per unit weight (region B).

That is, the reactor of the present invention enables synthesis of precursors having desired particle size using at a lower stirring power per unit weight, as compared to CSTR. This means that the reactor of the present invention has superior stirring efficiency as compared to CSTR.

EXAMPLE 1

Nickel sulfate, cobalt sulfate and manganese sulfate were mixed at a ratio (molar ratio) of 0.50:0.20:0.30, a 1.5M aqueous transition metal solution was prepared and a 3M aqueous sodium hydroxide solution was then prepared. As the ammonia solution, an aqueous solution in which ammonium ions are dissolved at 25 wt % was prepared.

The prepared aqueous transition metal solution was injected into the reactor using the metering pump for a retention time of one hour. The aqueous sodium hydroxide solution was variably injected using a metering pump such that pH is maintained at 11.0. The aqueous ammonia solution was continuously supplied at a concentration of 30 mol %, based on the aqueous transition metal solution.

The mean retention time was one hour, the reaction was continued for 20 hours after reached in a normal state, and the resulting nickel-cobalt-manganese composite transition metal precursor was washed with distilled water several times, and dried in a 120° C. constant-temperature drier for 24 hours, to prepare a nickel-cobalt-manganese composite transition metal precursor.

EXAMPLE 2

A nickel-cobalt-manganese composite transition metal precursor was prepared in the same manner as in Example 1, except that supply amounts were changed so as to adjust the retention time to 2 hours.

EXAMPLE 3

A nickel-cobalt-manganese composite transition metal precursor was prepared in the same manner as in Example 1, except that supply amounts were changed so as to adjust the retention time to 3 hours.

EXAMPLE 4

A nickel-cobalt-manganese composite transition metal precursor was prepared in the same manner as in Example 1, except that supply amounts were changed so as to adjust the retention time to 6 hours.

COMPARATIVE EXAMPLE 1

A nickel-cobalt-manganese composite transition metal precursor was prepared in the same manner as in Example 4, except that a continuous stirred tank reactor (CSTR) was used and an aqueous ammonia solution was added at a concentration 50 mol % of the aqueous transition metal solution.

EXPERIMENTAL EXAMPLE 1

Comparison in Production Amount Per Reactor Volume According to Retention Time

Production amounts according to volumes of the reactors used in Examples 1 to 4 and Comparative Example 1 were compared and the results thus obtained are shown in Table 1 below.

TABLE 1

| | Retention time | Production amount per reactor volume (g/L-hr) |
|---|---|---|
| Ex. 1 | 1 hour | 55.4 |
| Ex. 2 | 2 hours | 27.7 |
| Ex. 3 | 3 hours | 18.5 |
| Ex. 4 | 6 hours | 9.2 |
| Comp. Ex. 1 | 6 hours | 6.1 |

EXPERIMENTAL EXAMPLE 2

Analysis of Impurity Content 0.01 g of the prepared transition metal precursor was accurately metered and added to a 50 mL corning tube, and a small amount of acid was added dropwise thereto, followed by mixing while shaking. When the mixed sample was completely dissolved and was transparent in color, a concentration of $SO_4$ in the sample was measured using an Ion Chromatograph (DX500, model produced by Dionex Corp.). The results thus obtained are shown in Table 2 below.

TABLE 2

| | Retention time | $SO_4$ concentration (wt %) |
|---|---|---|
| Ex. 1 | 1 hour | 0.40 |
| Ex. 2 | 2 hours | 0.38 |
| Ex. 3 | 3 hours | 0.34 |
| Ex. 4 | 6 hours | 0.30 |
| Comp. Ex. 1 | 6 hours | 0.45 |

EXPERIMENTAL EXAMPLE 3

Particle Size Distribution Graph

Figure 5:
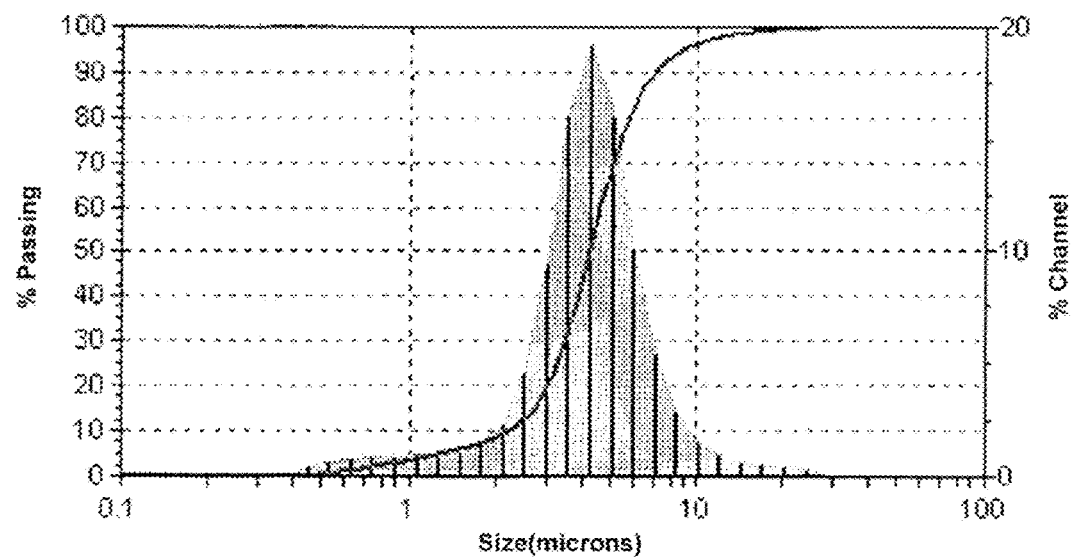
FIG. 5 is a graph showing a particle size distribution of precursor particles (mean particle diameter (D50): 4.07 μm) of Example 1.
Figure 6A:
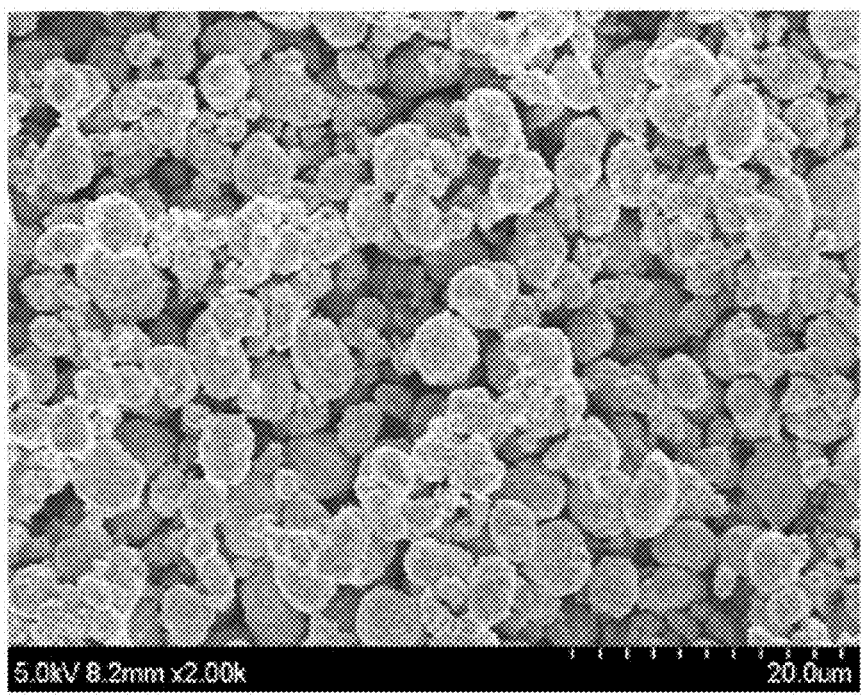
FIGS. 6A and 6B are SEM images of Example 1 and Comparative Example 1, as specific examples of the present invention.
Figure 6B:
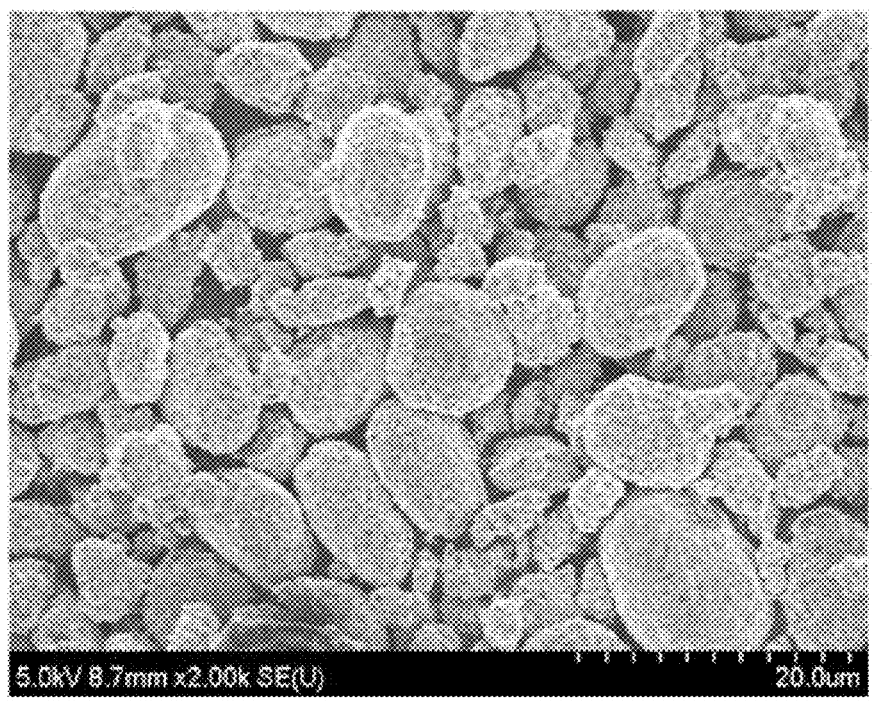
Figure 7:
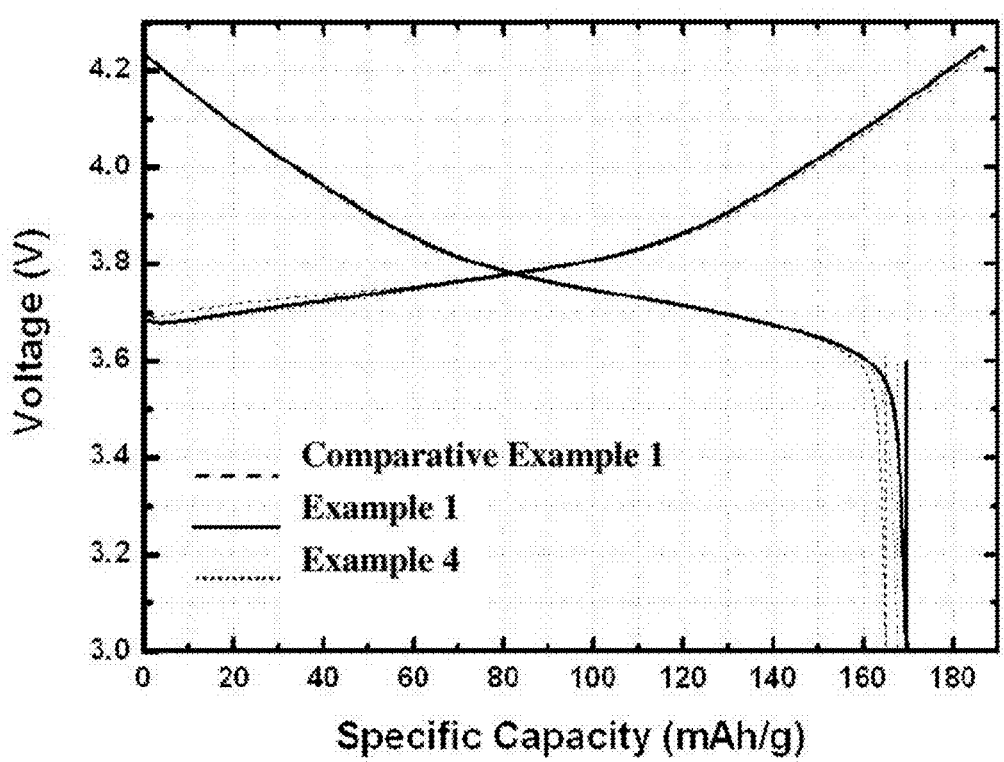
FIG. 7 is a graph showing electrochemical properties of lithium secondary batteries prepared in accordance with the method according to one embodiment of the present invention.

FIG. 5 is a graph showing a particle size distribution of precursor particles (mean particle diameter (D50): 4.07 μm) of Example 1, and FIGS. 6A and 6B are SEM images of Example 1 and Comparative Example 1, as specific examples of the present invention.

The following Table 3 shows mean particle sizes (D50) and coefficient of variation of precursor particles of Example 1 and Comparative Example 1. It can be seen from Table 3 that the precursor particles of Example 1 had a mean particle diameter of 5 μm or less, and coefficient of variation thereof had a single distribution of 0.375. On the other hand, the precursor particles of Comparative Example 1 had a mean particle diameter larger than 8 μm, and coefficient of variation thereof was 0.706. The precursor particles of Comparative Example 1 exhibited bad single distribution, as compared to precursor particles of Example 1.

TABLE 3

| | Mean particle size (D50) | C.V. |
|---|---|---|
| Ex. 1 | 4.07 μm | 0.375 |
| Comp. Ex. 1 | 9.46 μm | 0.706 |

EXPERIMENTAL EXAMPLE 4

Production of Coin Cells and Evaluation of Electrochemical Properties

The prepared transition metal precursors and $Li_2CO_3$ were mixed at a ratio (weight ratio) of 1:1, heated at an elevation speed of 5° C./min and baked at 920° C. for 10 hours to prepare a lithium composite transition metal oxide powder (cathode active material). The cathode active material powder thus prepared was mixed with Denka as a conductive agent and KF 1100 as a binder at a weight ratio of 95:2.5:2.5 to prepare a slurry, and the slurry was uniformly coated on an Al foil with a thickness of 20 μm. The coated material was dried at 130° C. to produce a cathode for lithium secondary batteries.

2032 coin cells were produced using the cathode for lithium secondary batteries thus produced, a lithium metal foil as a counter electrode (anode), a polyethylene membrane (Celgard, thickness: 20 μm) as a separation membrane, and a liquid electrolyte in which 1M $LiPF_6$ was dissolved in a mixed solvent containing ethylene carbonate, dimethylene carbonate and diethyl carbonate at a ratio of 1:2:1.

For the coin cells, electric properties of cathode active material were evaluated using an electrochemical analyzer (Toyo System, Toscat 3100U) at 3.0 to 4.25V. The results thus obtained are shown in Table 4.

TABLE 4

|  | Initial discharge capacity (mAh/g) | Initial efficiency (%) | 2C/0.1C (%) |
|---|---|---|---|
| Ex. 1 | 168.3 | 89.8 | 88.5 |
| Ex. 2 | 167.3 | 89.1 | 87.9 |
| Ex. 3 | 166.9 | 89.4 | 87.8 |
| Ex. 4 | 166.8 | 89.6 | 87.0 |
| Comp. Ex. 1 | 165.2 | 87.6 | 85.2 |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for preparing composite transition metal hydroxide particles using a reactor having a closed structure, the method comprising:
   injecting raw materials comprising an aqueous solution of two or more transition metal salts, an aqueous solution of a complex-forming additive, and a basic aqueous solution for maintaining pH of an aqueous solution of the raw materials within a range of 10 to 12, into a rotation reaction area of a reactor through an inlet; and
   performing a coprecipitation reaction under a non-nitrogen atmosphere for 1 to 6 hours,
   wherein the reactor comprises:
   a stationary hollow cylinder;
   a rotary cylinder having the same axis as the stationary hollow cylinder and an outer diameter smaller than an inner diameter of the stationary hollow cylinder;
   an electric motor to generate power, enabling rotation of the rotary cylinder;
   a rotation reaction area disposed between the stationary hollow cylinder and the rotary cylinder, wherein ring-shaped vortex pairs that are uniformly arranged in a rotation axis direction and rotate in opposite directions are formed in the rotation reaction area; and
   an inlet through which a reactant fluid is fed into the rotation reaction area and an outlet through which the reactant fluid is discharged from the rotation reaction area, wherein there is a distance between the stationary hollow cylinder and the rotary cylinder, and the ratio of that distance to the outer radius of the rotary cylinder is between 0.05 and 0.4.

2. The method according to claim 1, wherein a kinematic viscosity of reactant fluid is 0.4 to 400 cP and power consumed per unit weight thereof is 0.05 to 100 W/kg.

3. The method according to claim 1, wherein a critical Reynolds number of the vortex pairs is 300 or more.

4. The method according to claim 1, wherein the inlet comprises two or more inlets.

5. The method according to claim 4, wherein the two or more inlets are arrayed in a line by a predetermined distance in a direction of the outlet.

6. The method according to claim 1, wherein the aqueous solution of a complex-forming additive is present in an amount of 0.01 to 10% by weight, based on the total amount of the two or more transition metal salts.

7. The method according to claim 6, wherein the aqueous solution of a complex-forming additive is an aqueous ammonia solution.

8. The method according to claim 1, wherein the transition metal salt is a transition metal sulfate and/or a transition metal nitrate.

9. The method according to claim 8, wherein the sulfate comprises one or two or more selected from the group consisting of nickel sulfate, cobalt sulfate and manganese sulfate, and the nitrate comprises one or two or more selected from the group consisting of nickel nitrate, cobalt nitrate and manganese nitrate.

10. The method according to claim 1, wherein the transition metal composite hydroxide is a compound represented by Formula 1 below:

$$M(OH_{1-x})_2 \qquad (1)$$

wherein M comprises two or more selected from the group consisting of Ni, Co, Mn, Al, Cu, Fe, Mg, B, Cr and transition metals of the second period of the Periodic Table of the Elements; and $0 \leq x \leq 0.8$.

11. The method according to claim 10, wherein M comprises two or more transition metals selected from the group consisting of Ni, Co and Mn.

* * * * *